United States Patent [19]
Korus

[11] Patent Number: 6,109,535
[45] Date of Patent: Aug. 29, 2000

[54] CORROSION RESISTANT IRRIGATION MACHINE

[75] Inventor: Thomas J. Korus, Lindsay, Nebr.

[73] Assignee: Lindsay Manufacturing Company, Lindsay, Nebr.

[21] Appl. No.: 09/404,253

[22] Filed: Sep. 22, 1999

[51] Int. Cl.$^7$ .................................................. B05B 3/00
[52] U.S. Cl. ...................... 239/1; 239/730; 138/DIG. 6; 285/382.4
[58] Field of Search ...................... 138/114, 148, 138/DIG. 6; 285/5, 45, 55, 223, 284, 305, 382, 382.4; 239/728, 734, 726, 742, 566, 1

[56] References Cited

U.S. PATENT DOCUMENTS

| | | |
|---|---|---|
| 3,140,827 | 7/1964 | Fletcher . |
| 3,235,009 | 2/1966 | Nelson . |
| 3,301,277 | 1/1967 | Kelly . |
| 3,506,039 | 4/1970 | Marriott . |
| 3,643,867 | 2/1972 | Thietje . |
| 3,777,979 | 12/1973 | Ririe et al. ............................... 239/728 |
| 3,870,235 | 3/1975 | Newell . |
| 3,983,898 | 10/1976 | Zimmerer et al. . |
| 3,994,514 | 11/1976 | Zimmerer et al. . |
| 4,182,378 | 1/1980 | Dieter . |
| 4,650,471 | 3/1987 | Tamari ..................................... 138/114 |
| 4,693,279 | 9/1987 | Aubert . |
| 4,756,339 | 7/1988 | Buluschek . |
| 4,859,264 | 8/1989 | Buluschek . |
| 4,995,427 | 2/1991 | Berchem ................................. 138/155 |
| 5,090,745 | 2/1992 | Kluger .................................. 285/387.4 |
| 5,395,472 | 3/1995 | Mandich . |
| 5,433,252 | 7/1995 | Wolf et al. . |
| 5,435,495 | 7/1995 | Davis ..................................... 239/728 |
| 5,503,191 | 4/1996 | Morris . |

Primary Examiner—Kevin Weldon
Attorney, Agent, or Firm—McEachran, Jambor, Keating, Bock & Kurtz

[57] ABSTRACT

An irrigation machine distribution pipeline is protected against corrosion by a plastic liner within a steel pipeline. Access openings are spaced along the pipeline and aligned with apertures in the plastic liner. The liner extends the full length of the pipeline. The outside diameter of the liner is sufficiently less than the inside diameter of the pipeline to allow the liner to slide into the pipeline during installation of the liner. A plurality of plastic outlet fittings extend through each access opening and aperture. Each outlet fitting is in sealing engagement with the plastic liner and provides fluid communication from the interior of the plastic liner through the aperture to the exterior of the pipeline. With this construction none of the steel components of the pipeline comes in direct contact with the water.

21 Claims, 3 Drawing Sheets

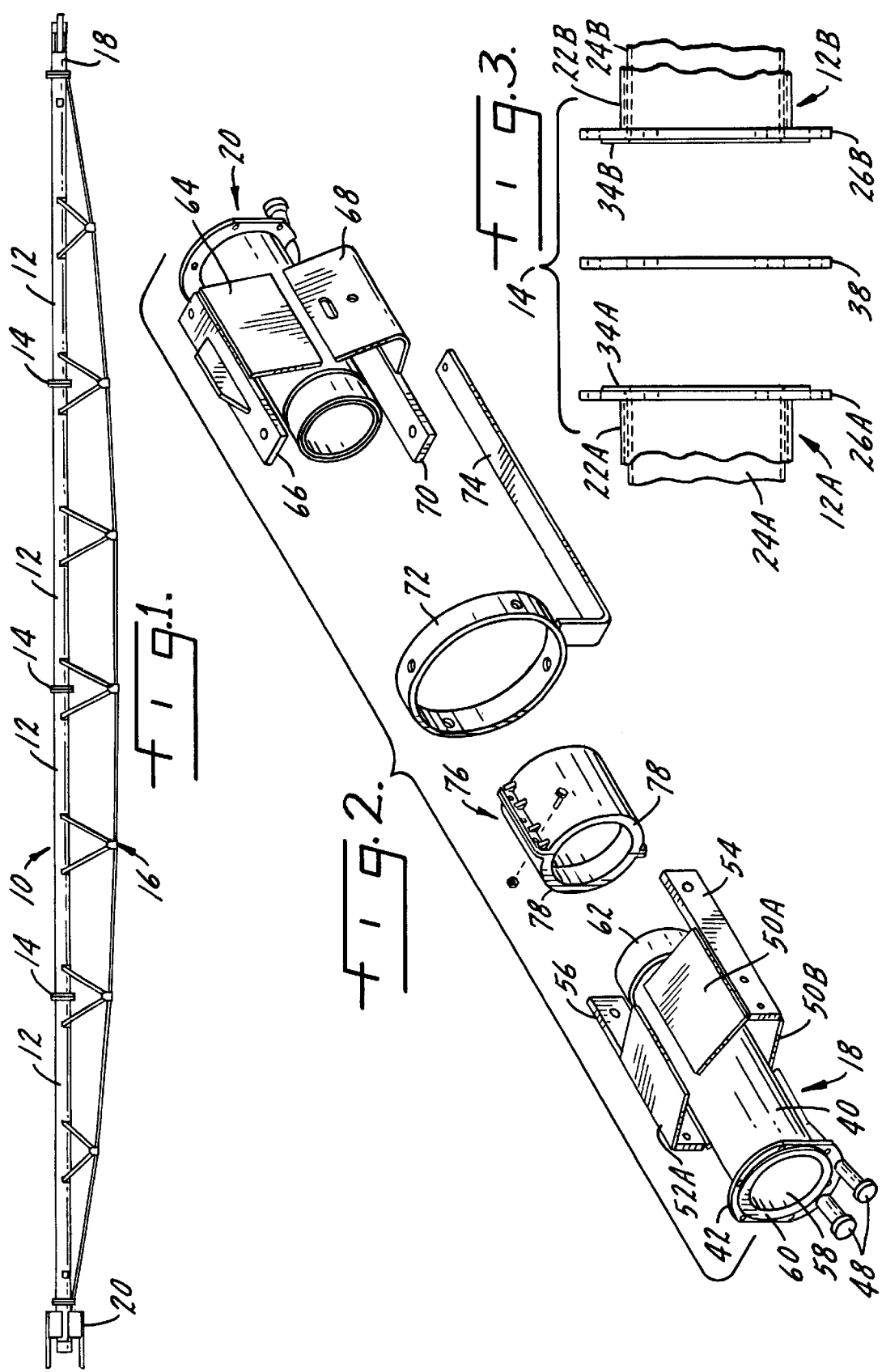

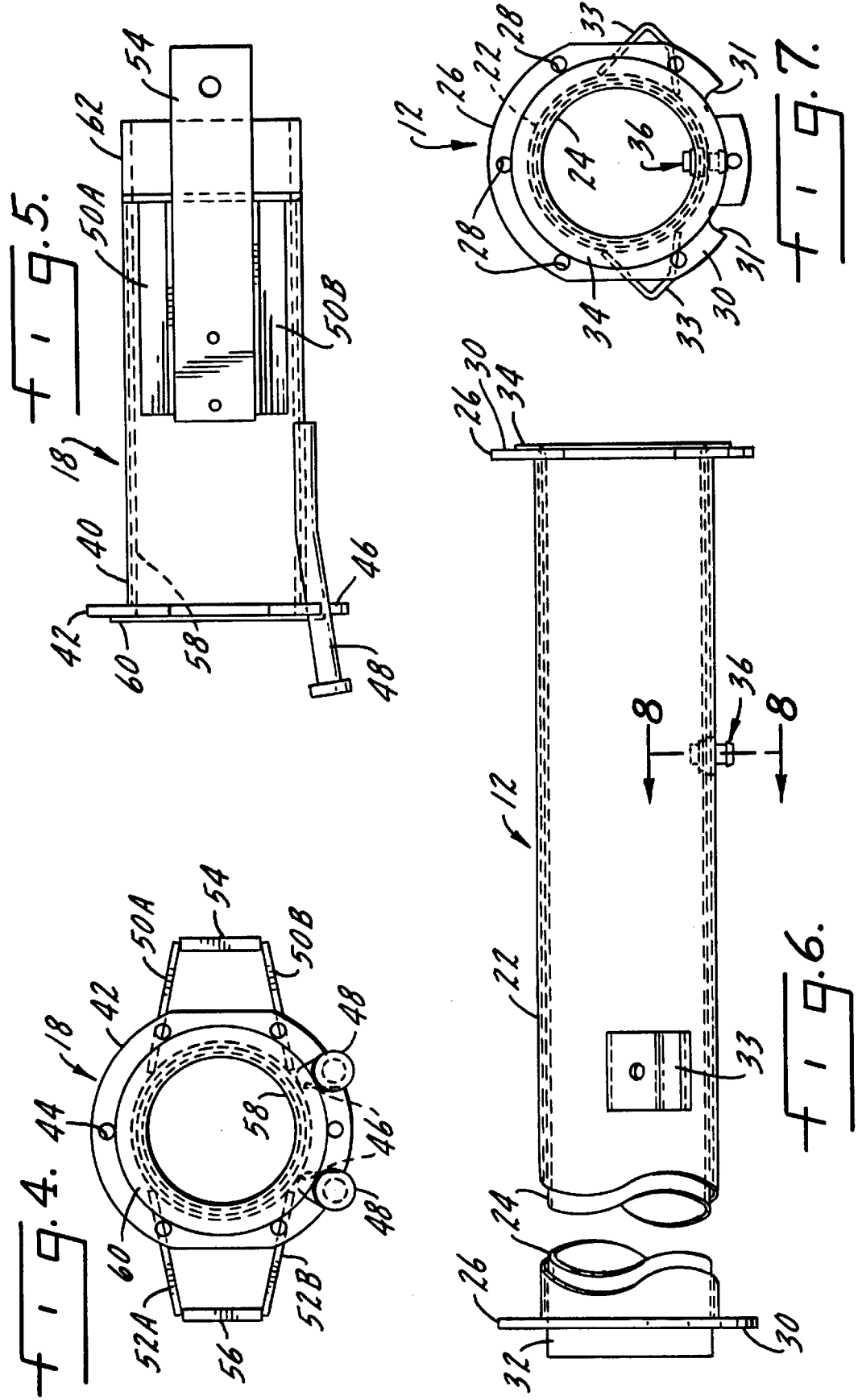

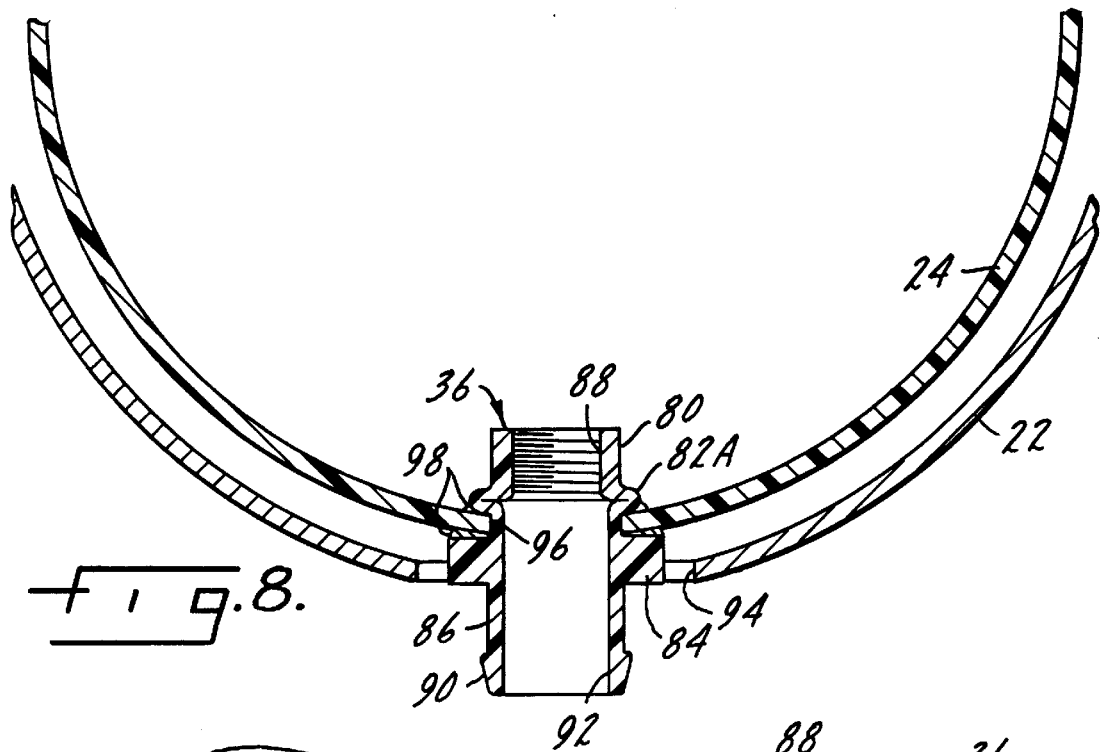
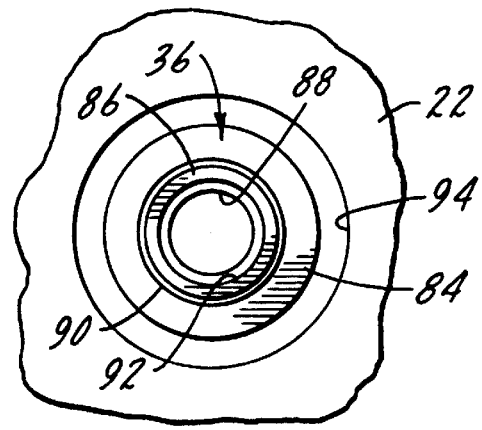
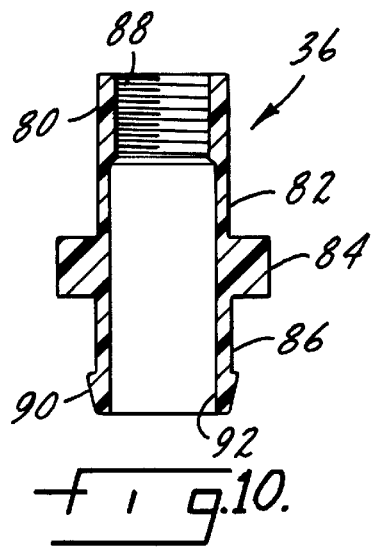

CORROSION RESISTANT IRRIGATION MACHINE

BACKGROUND OF THE INVENTION

Agricultural irrigation machines have been in use for many years to irrigate large fields growing crops. These machines have a pipeline supported on movable towers for movement across a field. Depending on the size of the field the pipeline may extend many hundreds of feet. In the most common arrangement one end of the pipeline is connected to a center pivot where a water supply is available. The pipeline moves in a circle about this center pivot. Sprinkler heads located along the pipeline distribute the water onto the field. The towers are usually propelled by electric motors and a pump provides the necessary water pressure. Further details of the structure of an irrigation machine are shown in U.S. Pat. No. 3,983,898, the disclosure of which is incorporated herein by reference.

The pipeline comprises a plurality of sections connected to one another at flexible joints. Each section in turn can be made of a plurality of pipe segments which are connected together at fixed joints. A typical section can have four segments and span a distance of about 180 feet. A pipeline section this long requires it to be bowed upwardly in a vertical plane in order to support its own weight and that of the water flowing through it. Bowing also assists drainage of the pipeline. A support truss is arranged under the pipeline to support it in the desired configuration. The pipe segments are usually made of galvanized steel. An outside diameter of 6⅝" with 11 gauge steel is typical. Given the span lengths, material and wall thickness, there are limits to the size of the openings in the pipe for the sprinkler heads. If the openings are too large, the span will kink at the overlarge openings instead of taking the desired bowed shape.

Galvanized steel provides sufficient corrosion protection for pipelines used with most ordinary water supplies used in normal agricultural irrigation applications. There is now developing a new use for irrigation machines in the water treatment industry. Current regulations permit certain effluent from treatment plants and the like to be sprayed onto the ground even though its condition would not permit the effluent to be released to the local watershed. For example, the salt content may be too high to permit release of the effluent. In some instances it may be less costly to spray the effluent onto a field using an irrigation machine than it would be to perform the final treatment steps required to remove the last remaining contaminants. However, it has been found that this effluent is more corrosive than ordinary water. In fact, the effluent will attack the galvanized pipeline if the pipeline is in direct contact with it. Premature failure of the pipeline is the result. Plastic pipe is not subject to this type of corrosion but it is not strong enough to support the weight of the water over the distances required. It has been proposed to combine plastic and steel and prevent direct contact of the effluent and steel by lining the steel pipeline with a plastic liner. The steel pipe provides the necessary mechanical strength and the liner prevents corrosion of the steel. But this has lead to other problems such as: difficulties installing the liner, particularly where a tight fit between the plastic and steel is attempted; differential expansion of the steel and plastic pipes; seepage between the steel and plastic portions at the sprinkler head connections; mechanical connection and sealing problems both at the fixed joints between pipeline segments and the flexible joints between pipeline sections.

Connecting a sprinkler head to the plastic-lined pipeline offers a particular challenge. Obviously the sprinkler head must fit through an opening in the steel pipeline to gain access to and provide fluid communication with the interior of the plastic liner. The sprinkler head must also form a seal with the plastic liner to prevent leakage. These two requirements tend to work against one another since the access opening size is limited (due to the kinking problem mentioned above) while sealing is most readily accomplished over a large surface area. In other words, a fitting that is easy to seal to the plastic liner will not fit through the limited size of the opening. For this reason gluing the fitting to the plastic liner is difficult at best due to the limited surface area of the fitting that can get through the steel pipe into contact with the liner. In addition to balancing these conflicting concerns, it should be remembered that the fitting itself must be protected against the corrosive effects of the liquid. This limits the possible materials that can be used in making the fitting.

SUMMARY OF THE INVENTION

The present invention is directed to a corrosion resistant irrigation machine having a plastic-lined steel pipeline. In a preferred embodiment the pipeline comprises a plurality of sections connected end to end at flexible joints. Each section in turn is made up of at least two segments connected by flanges at fixed joints. Each segment comprises a plastic tube within a steel pipe. The plastic tube has an outside diameter which is sufficiently less than the inside diameter of the steel pipe to allow the tube to slide freely into the pipe during installation, i.e., there is no interference between the tube and pipe. The ends of the steel pipe have first flanges welded thereon. Second flanges on the ends of the plastic tube engage the first flanges to longitudinally fix the plastic tube in the steel pipe. Preferably the second flanges are formed by swaging protruding portions on the ends the plastic tube after it has been placed into the steel pipe.

The plastic tube and steel pipe have a plurality of aligned apertures and access openings, respectively. A fitting extends through each access opening and into sealing engagement with the plastic tube. The fitting provides fluid communication from the interior of the tube to the exterior of the pipe. Each fitting has a base, an expandable waist and a shoulder. Prior to installation the base and waist will fit through the access opening and the plastic tube aperture but the shoulder will not fit through the aperture. The base is drawn toward the shoulder, causing the waist to collapse and expand. The waist then engages the inside wall of the plastic tube. This traps the tube wall between the expanded waist and shoulder. The fitting is made of plastic.

The plastic liner and plastic fitting provide complete corrosion protection of the steel pipeline while requiring minimal alteration of existing irrigation equipment.

BRIEF DESCRIPTION OF THE DRAWINGS

FIG. 1 is a side elevation view of a single pipeline section including four segments.

FIG. 2 is an exploded perspective view of a flexible joint which is used to join pipeline sections.

FIG. 3 is an exploded side elevation view of a fixed joint which is used to join pipeline segments.

FIG. 4 is an end elevation view of a flexible joint extension member.

FIG. 5 is a side elevation view of the flexible joint extension member of FIG. 4.

FIG. 6 is a side elevation view of a partially assembled pipeline segment, including a steel pipe and plastic tube, with the tube's flange completed on the right hand end while the left hand end of the tube is shown prior to forming a flange.

FIG. 7 is an end elevation view of the pipeline segment, looking from the right end of FIG. 6.

FIG. 8 is an enlarged section taken along line 8—8 of FIG. 6.

FIG. 9 is a bottom plan view of the pipeline and fitting.

FIG. 10 is a section through a fitting prior to installation.

DETAILED DESCRIPTION OF THE INVENTION

A portion of the corrosion resistant irrigation machine according to the present invention is shown in FIG. 1 which illustrates a section 10 of an elongated pipeline. The complete pipeline will ordinarily comprise several sections connected at flexible joints. The flexible joints will be described below. It will be understood that the pipeline sections are supported on movable towers (not shown) in the conventional manner. One end of the pipeline is connectable to a supply of water to be distributed. Commonly this connection will be at a center pivot with the rest of the pipeline moving in a circle about the pivot. The irrigation machine of the present invention is intended to be used for distributing a supply of water that contains contaminants which would corrode an ordinary galvanized steel pipeline and cause premature failure. This invention provides a pipeline in which the majority of the components coming in contact with the water being distributed are plastic. Water-contacting components that are not plastic are made of stainless steel. Such components are not subject to corrosive attack and will give the unit a full measure of useful life.

The pipeline section 10 comprises a series of segments 12 connected in end to end fashion at fixed joints 14. The pipeline section is supported by a truss 16 in the conventional manner. The section may also be bowed upwardly as explained above. The outer ends of the section have flexible joint assemblies connected thereto. These include a horizontal joint assembly 18 and a vertical joint assembly 20. Details of both the flexible joint assemblies and the fixed joint components will be described below.

As used herein, the term pipeline refers to the entire liquid conduit of an irrigation machine and has at least one section. Sections are connected to one another at flexible joints. A section has at least one segment and most commonly has two or more segments connected at a fixed joint. A segment refers to the combination of an outer pipe and an inner tube. The term plastic liner refers to the plastic tubes of a pipeline collectively.

Turning now to FIGS. 6 and 7, details of a typical segment 12 will be described. Each segment includes an outer pipe 22 and an inner plastic tube 24. The pipe 22 is preferably galvanized steel. The tube 24 is made of suitable plastic such as PVC. The outside diameter of the tube 24 is less than the inside diameter of the pipe 22. By way of example and not by limitation, the steel pipe may have an outside diameter of 6.625" and an inside diameter of 6.375" while the plastic tube has an outside diameter of 6.140" and an inside diameter of 5.900". It will be understood that different pipe and tube diameters could be used. The important point is that the tube's outside diameter is small enough to allow it to slide easily within the pipe. Thus, the tube is inserted by hand during installation. There is no interference between the tube and pipe.

The outer ends of the tube 22 have first flanges 26 attached thereto. Bolt holes 28 (FIG. 7) are provided in the first flanges 26 to receive connecting bolts. The flanges define outwardly directed faces 30. There may be notches 31 on the underside of the flanges 26 to provide clearance for truss rods and the like. The tube 22 also has a plurality of brackets 33 welded thereto for attachment of the truss components 16.

The plastic tube 24 has a length greater than that of the pipe 22. Accordingly, upon installation the tube 24 will necessarily have at least one protruding portion, such as shown at 32, extending beyond at least one end of the pipe. A second flange 34 is formed on the protruding portion of the tube. The second flange, as shown at the right end of FIG. 6, is engageable with the face 30 of the mating or adjoining first flange 26. It can be seen that the outside diameter of the second flange 34 is slightly less than the minor diameter of the circle defined by the bolt holes 28. Thus, the flange 34 does not interfere with the connecting bolts extending through holes 28.

In a preferred method of manufacture, the second flange 34 is formed by first heating the protruding portion 32 of the plastic tube and then swaging it into the shape shown at the right end of FIG. 6 and in FIG. 7. It is also preferred to have a protruding portion and a second flange at both ends of the tube. This locks the tube in place in the pipe. It will be understood that the protruding portion 32 at the left end of FIG. 6 is illustrated prior to swaging it into a second flange 34. An alternate method of making the second flange is to glue a ring or plastic molded collar of suitable size and shape onto the protruding portion 32.

The pipeline segment is completed by a plurality of fittings, one of which is shown at 36. The fittings are located at suitable intervals along the segment. The size and spacing of the fittings is chosen to suit the desired application rate. Although the location shown on the bottom the segment is preferred, the fittings could be placed on the sides or even the top of the segment. A suitable spray nozzle (not shown) or a drop tube with a nozzle may be attached to the fitting for spraying water onto the ground. The fittings extend through openings in both the tube 24 and pipe 22 to provide fluid communication to the interior of the tube. Details of the fitting are described below.

A fixed joint 14 between two of the segments 12 is illustrated in FIG. 3. The right end of a segment 12A is joined to the left end of a segment 12B by means of bolts (not shown) extending through the bolt openings 28 in the first flanges 26A and 26B. A plastic gasket 38 sits between the first flanges 26. It has a central opening large enough to accommodate the inside diameter of the tubes 24. Thus, the gasket 38 rests between and in contact with the faces of the second flanges 34. The gasket 38 prevents leakage from the joint 14 and, in fact, prevents contact of the water with the steel flanges 26.

Turning now to FIGS. 4 and 5, details of one of the flexible joint assemblies 18 are shown. The assembly includes a tubular extension 40. Preferably it is made of galvanized steel. One end of the extension 40 has an anchor flange 42. The anchor flange has bolt holes 44 arranged in a pattern to match the holes 28 of the segment 26. Flange 42 also has two notches 46 on its lower half which receive a pair of anchor rods 48. The rods are welded or otherwise attached to the outer surface of the extension 40. The rods provide an anchoring point for the truss 16. The exterior of the extension also carries side plates 50A and 50B on one side and a similar pair of side plates 52A and 52B on the other side. Together the pairs of side plates 50 and 52 form brackets which mount hinge straps 54 and 56. The purpose of the hinge straps will be described momentarily.

The interior of the extension 40 is lined with a plastic sleeve 58. The sleeve terminates at one end in a flange 60 that engages the face of the anchor flange 42. Flange 60 may be formed by swaging as in the case of the plastic tube flanges. At the other end of the extension 40, the sleeve 58 protrudes beyond the extension to define a cuff portion 62 of the sleeve. The cuff 62 has an outside diameter that matches that of the extension 40. The cuff is preferably formed by an annular collar that is glued to the protruding portion of the sleeve 58. The collar has an inside diameter that matches the outside diameter of the sleeve. And, as mentioned, the outside diameter of the collar matches that of the extension. Since the collar engages the end face of the extension 40, this, in conjunction with the plastic flange 60 engaging the steel flange 42, locks the sleeve within the extension.

Looking now at FIG. 2, the complete flexible joint is shown. The joint assembly 20 is essentially similar to the assembly 18 with the exception that the side plates and hinge straps are rotated 90° so they are in essentially a vertical plane instead of a horizontal plane. That is, side plates 64 support a top strap 66 and side plates 68 supports a bottom strap 70. The side plates 68 are different from the others in that they are folded outwardly as indicated to provide a tower mounting bracket. The hinge straps 54, 56, 66 and 70 are connected to a gimbal ring 72. A connecting rod 74 fastened to the gimbal ring extends to a control box (not shown) to activate a tower motor when adjacent pipeline sections are misaligned. The gimbal ring 72 has holes which receive bolts that extend through matching holes in the ends of the hinge straps. The gimbal ring 72 and straps provide flexibility in both horizontal and vertical directions while preventing longitudinal separation of the joint assemblies. When the joint assemblies are fastened to the gimbal ring, the adjoining cuffs 62 are located adjacent one another. There may be a gap of a few inches between their end faces to permit slight relative movement between the cuffs. The junction of the cuffs is sealed by a split coupler assembly 76 which surrounds the cuffs and provides fluid communication between them. A coupler assembly may be as shown and described in U.S. Pat. No. 3,994,514, the disclosure of which is incorporated herein by reference. The assembly includes a pair of semi-cylindrical halves 78 and an internal sealing boot (not shown). The boot may be made of rubber or the like to allow it to flex while sealing the ends of the cuffs. Since the cuffs are designed to provide the same outside diameter as the extensions 40, the coupler assembly can be the same part as used in a conventional irrigation machine.

Having described the pipeline and plastic liner, attention will now be turned to the matter of getting the water out of the plastic liner and onto a field. As mentioned above, there are plurality of fittings 36 spaced along the pipeline, in sealing engagement with the plastic liner and providing fluid communication from the interior of the liner to the exterior of the pipeline. FIG. 10 illustrates the fitting 36 prior to installation in the pipeline. It is preferably made of PVC, although ABS or even stainless steel are possible alternates. The fitting has a base 80, an expandable waist 82, a shoulder 84 and a head 86. The base has internal threads 88. The head has a retention element, in this case, in the form of a lip 90 on the external surface. Alternately, there could be internal threads in the head portion. A bore 92 extends through the full length of the fitting. The bore provides fluid communication from the interior of the plastic liner to the exterior of the pipeline. By way of illustration and not by limitation, the outside diameter of the base and waist could be about 0.75" while the outside diameter of the shoulder is about 1.25". The inside diameter of the bore 92 is about 0.51" at the base, increasing to 0.63 at the waist and head.

Installation of the fitting 36 will be described in conjunction with FIGS. 8 and 9. The steel pipe 22 has an access opening 94 formed therein. The diameter of the access opening 94 is greater than the outside diameter of the shoulder 84. The plastic liner 24 has an aperture 96 aligned with the access opening 94. As evident in FIG. 8, the diameter of the aperture 96 is smaller than that of the access opening 94. The aperture diameter is also less than the outside diameter of the shoulder 84 so that the shoulder will not fit through the aperture. However, the diameter of the base 80 and waist 82 prior to expansion thereof will fit through the aperture 96.

The installation process may be as follows. A fixture or jig is prepared for drawing a swaging tool in a linear direction. The jig has first and second spaced, parallel fixed plates which mount a pair of parallel rods. A movable plate is linearly slidable on the rods between the fixed plates. The movable plate has a side-opening catch for receiving a swaging tool shank. A connecting rod is fastened to the movable plate and extends through a bore in the first fixed plate for connection to a hydraulic actuator. The second fixed plate has an side-opening slot or notch along one edge. This slot is sized to receive the head 86 of a fitting 36 but not the shoulder 84. To begin the installation a collar is threaded onto a swaging tool such as an elongated, threaded bolt. The collar is placed near the head of the bolt. The bolt is inserted into the bore 92 of a fitting 36 from the head end 86. The bolt engages the threads 88 on the interior of the base 80. Once the bolt is in place the bolt and fitting are placed in the jig. The bolt shank fits in the catch slot and the bolt head is engaged by the catch. The fitting's head 86 fits in the second fixed plate notch. The outer surface of the second fixed plate engages the face of the shoulder 84 which is toward the head 86. The jig's connecting rod is attached to the hydraulic actuator. With the fitting and jig prepared, the fitting's shoulder surface toward the base is covered with heavy-bodied PVC cement as shown at 98. The aperture area of the PVC pipe may also be coated with the cement. Then the base 80 and waist 82 of the fitting, with the jig attached to the head 86, are placed into the access opening 94 and aperture 96 of the steel pipe and plastic liner until the shoulder 84 engages the outer surface of the plastic tube 24. Thus, the base and waist of the fitting extend into the interior of the plastic tube 24. Application of hydraulic pressure causes the movable plate (and thus the catch and the swaging bolt) to move linearly away from the second fixed plate. Since the shoulder 84 is held stationary by the fixed plate, the movement of the bolt draws the base 80 toward the head 86 and causes the waist to collapse and expand outwardly as shown at 82A in FIG. 8. This expanded portion of the waist engages the inner wall of the plastic tube 24, thereby trapping the wall 24 between the waist 82A and the shoulder 84. The expanded waist also conforms to the curvature of the tube 24. In conjunction with the PVC cement 98, a fluid tight seal is formed. After this swaging operation, the collar is tightened onto the top of the head 86 and the jig is removed from the swaging tool. The collar will hold the fitting tight until the cement dries. Then the collar is backed off and the bolt can be removed from the fitting to complete the installation.

Drop tubes are usually connected to the fittings. This is done because it is preferred to keep the water off the pipeline exterior and the towers. However, it is not absolutely necessary to keep exterior parts dry because the most potent corrosive effects are engendered by stagnant water inside the pipeline and the abrasion of solids in the water. These things don't have such an impact on the exterior of the pipeline or the tower parts. Also, these external parts get cleaned off periodically by rain, which is not the case with internal surfaces.

While a preferred form of the invention has been shown and described, it will be realized that alterations and modifications may be made thereto without departing from the scope of the following claims.

What is claimed is:

1. A corrosion resistant water distribution system, comprising:
    an elongated pipeline having at least one section with one end thereof connectable to a supply of water to be distributed, the pipeline including a plurality of access openings spaced along the pipeline;
    a plastic liner mounted within the pipeline and extending the full length of the pipeline, the outside diameter of the liner being sufficiently less than the inside diameter of the pipeline to allow the liner to slide into the pipeline during installation of the liner in the pipeline, the plastic liner having a plurality of apertures located in alignment with the access openings of the pipeline;
    a plurality of outlet fittings, one fitting extending through each access opening, each outlet fitting being in sealing engagement with the plastic liner and providing fluid communication from the interior of the plastic liner through the aperture to the exterior of the pipeline.

2. The structure of claim 1 wherein each fitting comprises expansion means for engaging the plastic liner, the expansion means being sized to fit through the access opening during installation and then being expandable to engage the plastic liner over a greater area than prior to expansion.

3. The structure of claim 2 wherein the expansion means is sized to fit through the aperture in the plastic liner and engage the inside wall of the plastic liner after expansion.

4. The structure of claim 1 wherein each fitting comprises a base, an expandable waist and a shoulder, the base and waist prior to installation being sized to fit through the plastic liner aperture while the shoulder will not fit through said aperture, the waist being expandable to engage the inside wall of the plastic liner, thereby trapping the liner between the expanded waist and shoulder.

5. The structure of claim 4 wherein the shoulder fits through the access opening.

6. The structure of claim 1 wherein the pipeline section comprises at least two segments each having a pipe and first flanges with outwardly directed faces at the ends of the pipe, the segments being connected end to end by mating first flanges at a fixed joint, and the plastic liner comprises a plastic tube in each segment, the plastic tubes each having a length greater than that of the pipe such that there is a protruding portion defined at least one end of the segment, and a second flange on the protruding portion of the plastic tube, the second flange being engageable with the mating first flanges at a fixed joint.

7. The structure of claim 6 wherein the plastic tubes each have a length and are positioned with the pipe such that there are protruding portions defined at both ends of the segment, and second flanges attached to each protruding portion of the plastic tube, the second flanges being engageable with the mating first flanges at a fixed joint.

8. The structure of claim 6 wherein the pipeline comprises at least two sections connected at a flexible joint.

9. The structure of claim 8 wherein the flexible joint comprises first and second joint assemblies each having an extension and an anchor flange on one end thereof for connection to a first flange of an adjoining pipeline section, the extensions being joined together at a hinge, each extension having a plastic sleeve therein that protrudes beyond facing ends of the extensions to define cuff portions aligned with one another, and a coupler assembly surrounding the cuffs and providing fluid communication between them.

10. The structure of claim 9 wherein the sleeve further comprises a flange on the end thereof opposite the cuff, the flange being engageable with the anchor flange.

11. The structure of claim 1 wherein the pipeline comprises at least two sections connected at a flexible joint.

12. The structure of claim 11 wherein the flexible joint comprises first and second extensions each having an anchor flange on one end for connection to a first flange of an adjoining pipeline section, the extensions being joined together at a hinge, each extension having a plastic sleeve therein that protrudes beyond facing ends of the extensions to define cuff portions aligned with one another, and a coupler assembly surrounding the cuffs and providing fluid communication between them.

13. The structure of claim 12 wherein the sleeve further comprises a flange on the end thereof opposite the cuff, the flange being engageable with the anchor flange.

14. In a water distribution system of the type having an elongated pipeline having at least one section with one end thereof connectable to a supply of water to be distributed, the pipeline section comprising at least two segments each having a pipe and first flanges with outwardly directed faces at the ends thereof, the segments being connected end to end by mating first flanges at a fixed joint, the pipeline including a plurality of access openings spaced along the pipeline, the improvement comprising a method of protecting the pipeline section from corrosion, the method comprising the steps of:
    preparing a plastic tube for each pipe, the tube having a length greater than that of the pipe, the outside diameter of the liner tube being sufficiently less than the inside diameter of the pipe to allow the tube to slide within the pipe;
    sliding a plastic tube into each pipe prior to connection of the segments to one another and positioning the tube such that there is a protruding portion defined at least one end of the pipe extending beyond one of the first flanges of the pipe;
    forming a second flange on the protruding portion of the plastic tube, the second flange being engageable with the first flange face; and
    joining the segments together at mating first flanges.

15. The method of claim 14 wherein the step of forming a second flange is further characterized by swaging the protruding portion.

16. The method of claim 14 further comprising the steps of choosing the length of the plastic tube and placing it in the pipe such that protruding portions are defined at both ends of the pipe, and forming second flanges at both ends of the tube with the second flanges each engaging its associated first flange face.

17. The method of claim 16 wherein the step of forming the second flanges is further characterized by swaging the protruding portions.

18. A corrosion resistant water distribution system, comprising:
    an elongated pipeline having at least one section with one end thereof connectable to a supply of water to be distributed, the pipeline including a plurality of access openings spaced along the pipeline;
    a plastic liner mounted within the pipeline and extending the full length of the pipeline, the plastic liner having a plurality of apertures located in alignment with the access openings of the pipeline;
    a plurality of outlet fittings, one fitting extending through each access opening, each outlet fitting being in sealing engagement with the plastic liner and providing fluid communication from the interior of the plastic liner through the aperture to the exterior of the pipeline, each fitting comprising expansion means for engaging the plastic liner, the expansion means being sized to fit through the access opening during installation and then being expandable to engage the plastic liner over a greater area than prior to expansion.

19. The structure of claim 18 wherein the expansion means is sized to fit through the aperture in the plastic liner and engage the inside wall of the plastic liner after expansion.

20. The structure of claim 18 wherein each fitting comprises a base, an expandable waist and a shoulder, the base and waist prior to installation being sized to fit through the plastic liner aperture while the shoulder will not fit through said aperture, the waist being expandable to engage the inside wall of the plastic liner, thereby trapping the liner between the expanded waist and shoulder.

21. The structure of claim 20 wherein the shoulder fits through the access opening.

* * * * *